(12) United States Patent
Lee et al.

(10) Patent No.: US 12,717,190 B2
(45) Date of Patent: Aug. 25, 2026

(54) OPTICAL PATH CONTROL MEMBER AND DISPLAY DEVICE INCLUDING SAME

(71) Applicant: LG INNOTEK CO., LTD., Seoul (KR)

(72) Inventors: Jong Sik Lee, Seoul (KR); Jin Gyeong Park, Seoul (KR); Byung Sook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 57 days.

(21) Appl. No.: 18/724,438

(22) PCT Filed: Nov. 23, 2022

(86) PCT No.: PCT/KR2022/018573
§ 371 (c)(1),
(2) Date: Jun. 26, 2024

(87) PCT Pub. No.: WO2023/128288
PCT Pub. Date: Jul. 6, 2023

(65) Prior Publication Data

US 2025/0060632 A1 Feb. 20, 2025

(30) Foreign Application Priority Data

Dec. 28, 2021 (KR) ........................ 10-2021-0190194

(51) Int. Cl.
*G02F 1/1339* (2006.01)
*G02F 1/1343* (2006.01)

(52) U.S. Cl.
CPC ...... *G02F 1/1339* (2013.01); *G02F 1/134309* (2013.01)

(58) Field of Classification Search
CPC ......................... G02F 1/1339; G02F 1/134309
See application file for complete search history.

(56) References Cited

U.S. PATENT DOCUMENTS 10,186,686 B2 1/2019 Kwon
2005/0099559 A1 5/2005 Lee et al.
(Continued)

FOREIGN PATENT DOCUMENTS

JP 2010-85566 A 4/2010
JP 2019-60946 A 4/2019
(Continued)

OTHER PUBLICATIONS

International Search Report dated Feb. 28, 2023 in International Application No. PCT/KR2022/018573.
(Continued)

*Primary Examiner* — David Y Chung
(74) *Attorney, Agent, or Firm* — SALIWANCHIK, LLOYD & EISENSCHENK

(57) ABSTRACT

An optical path control member according to an embodiment includes a first substrate; a first electrode disposed on the first substrate; a second substrate disposed on the first substrate; a second electrode disposed under the second substrate; a light conversion unit including a plurality of accommodating parts disposed between the first electrode and the second electrode and in which a light conversion material is disposed; a first sealing part and a second sealing part formed in a cutting region formed by cutting the second substrate, the second electrode, and the light conversion unit, and disposed extending in a first direction; and a third sealing part and a fourth sealing part formed in a cutting region formed by cutting the second substrate, the second electrode, and the light conversion unit, and disposed extending in a second direction different from the first direction, and wherein a width of the first sealing part is 0.2 mm or less.

15 Claims, 16 Drawing Sheets

(56) References Cited

U.S. PATENT DOCUMENTS

| | | | | |
|---|---|---|---|---|
| 2008/0137024 | A1* | 6/2008 | Nagami | G02F 1/1341 349/154 |
| 2009/0109520 | A1 | 4/2009 | Park et al. | |
| 2017/0117505 | A1 | 4/2017 | Kwon | |
| 2023/0324728 | A1* | 10/2023 | Ju | G02B 5/30 349/56 |
| 2023/0341742 | A1* | 10/2023 | Lee | G02F 1/167 |

FOREIGN PATENT DOCUMENTS

| | | | | |
|---|---|---|---|---|
| KR | 10-1257685 | B1 | 4/2013 | |
| KR | 10-2017-0049653 | A | 5/2017 | |
| KR | 10-2018-0004879 | A | 1/2018 | |
| KR | 10-2021-0136603 | A | 11/2021 | |
| WO | WO-2022050745 | A1 * | 3/2022 | H10K 59/8722 |
| WO | WO-2022050746 | A1 * | 3/2022 | G02F 1/1323 |

OTHER PUBLICATIONS

Office Action dated Nov. 20, 2024 in Korean Application No. 10-2021-0190194.

* cited by examiner

600
CTA1-2
CTA1-1
120
CTA2-1
CTA2-2
600
CTA
210
410
700

FIG. 8

510
600
CTA1-2
CTA1-1
120
330
CTA2-1
CTA2-2
520
600
320
210
410
700

LIGHT 110
210
410
300
420
220
120
310
320
330b 330a
330

PUBLICATION MODE

OPTICAL PATH CONTROL MEMBER AND DISPLAY DEVICE INCLUDING SAME

CROSS-REFERENCE TO RELATED APPLICATIONS

This application is the U.S. national stage application of International Patent Application No. PCT/KR2022/018573, filed Nov. 23, 2022, which claims the benefit under 35 U.S.C. § 119 of Korean Application No. 10-2021-0190194, filed Dec. 28, 2021, the disclosures of each of which are incorporated herein by reference in their entirety.

TECHNICAL FIELD

An embodiment relates to an optical path control member and a display device including the same.

BACKGROUND ART

A light blocking film is an optical path control member that blocks light being transmitted from a light source. The optical path control member is attached to a front surface of a display panel which is a display device used for a mobile phone, a notebook, a tablet PC, a vehicle navigation device, a vehicle touch, etc. In addition, the optical path control member adjusts a viewing angle of light according to an incident angle of light when the display transmits a screen. Accordingly, the optical path control member may express clear image quality at a viewing angle desired by a user In addition, the optical path control member may be used for the window of a vehicle, building or the like to shield outside light partially to inhibit glare. Alternatively, the optical path control member may be used to inhibit the inside from being visible from an outside.

That is, the optical path control member may control a movement path of light. Thereby, light in a specific direction may be blocked, and light in a specific direction may be transmitted. Accordingly, it is possible to control the viewing angle of the user by controlling a transmission angle of the light by the optical path control member.

Meanwhile, such the optical path control member may be divided into a light blocking film that can always control the viewing angle regardless of the surrounding environment or the user's environment and a switchable light blocking film that allow the user to turn on/off the viewing angle control according to the surrounding environment or the user's environment.

A light conversion material including particles moving according to the application of a voltage and a dispersion for dispersing the particles, may be filled inside a pattern part of the optical path control member. Accordingly, the pattern part may be converted into a light transmitting part and a light blocking part by the dispersion and aggregation of the particles.

One surface of the optical path control member is cut to seal the inside of the pattern part of the light conversion material, and a sealing material may be filled in a cutting region. Accordingly, a sealing part may be formed inside the pattern part.

Specifically, in order to seal the light conversion material inside the accommodating part after filling the cutting region with a light conversion material, the sealing material may be filled inside the cutting region. In this case, if a width of the cutting region increases, an injection amount of the sealing material may also increase. Accordingly, in a process of forming the sealing part, the sealing material may overflow into the cutting region.

Therefore, there is a problem that the user recognizes stains caused by sealing materials outside the optical path control member.

Accordingly, an optical path control member having a new structure capable of solving the above problems is required.

DISCLOSURE

Technical Problem

The embodiment provides an optical path control member having improved reliability and capable of having a narrow bezel region.

Technical Solution

An optical path control member according to an embodiment includes a first substrate; a first electrode disposed on the first substrate; a second substrate disposed on the first substrate; a second electrode disposed under the second substrate; a light conversion unit including a plurality of accommodating parts disposed between the first electrode and the second electrode and in which a light conversion material is disposed; a first sealing part and a second sealing part formed in a cutting region formed by cutting the second substrate, the second electrode, and the light conversion unit, and disposed extending in a first direction; and a third sealing part and a fourth sealing part formed in a cutting region formed by cutting the second substrate, the second electrode, and the light conversion unit, and disposed extending in a second direction different from the first direction, and wherein a width of the first sealing part is 0.2 mm or less.

Advantageous Effects

In the optical path control member according to the embodiment, upper and lower bezel regions may be reduced.

Specifically, a width of a cutting region of a first sealing part, a second sealing part, a dam part, and a connection region disposed on and below the optical path control member may be formed to be small. Accordingly, sizes of a first sealing part, a second sealing part, a dam part, and a connection region disposed inside the cutting region may be reduced.

Accordingly, the sizes of the first sealing part, the second sealing part, the dam part, and the connection region disposed in the bezel region and distances therebetween may be reduced. Accordingly, the bezel region of the optical path control member may be reduced.

In addition, when forming a first sealing part, a second sealing part, a dam part, and a connection region using a resin material or a conductive material inside the cutting region, overflowing of the resin material may be inhibited. Accordingly, it is possible to inhibit stains from occurring on the optical path control member.

In addition, the optical path control member according to the embodiment may make upper and lower bezel regions greater than left and right bezel regions. Accordingly, the optical path control member may be easily mounted on a display device that requires an upper and lower bezel region greater than the left and right bezel regions. In addition, a bezel region of the display device may be narrowed.

DESCRIPTION OF DRAWINGS

FIG. 3 is top view of a second substrate of an optical path control member according to an embodiment.

FIGS. 7 to 9 are views for explaining a process of forming a sealing part of an optical path control member according to an embodiment.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and redisposed.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", or "coupled" to another element, it may include not only when the element is directly "connected" to, or "coupled" to other elements, but also when the element is "connected", or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member according to an embodiment will be described with reference to drawings. The optical path control member described below may be a switchable light blocking film that operates in public mode and light blocking mode depending on the application of power.

Figure 1:
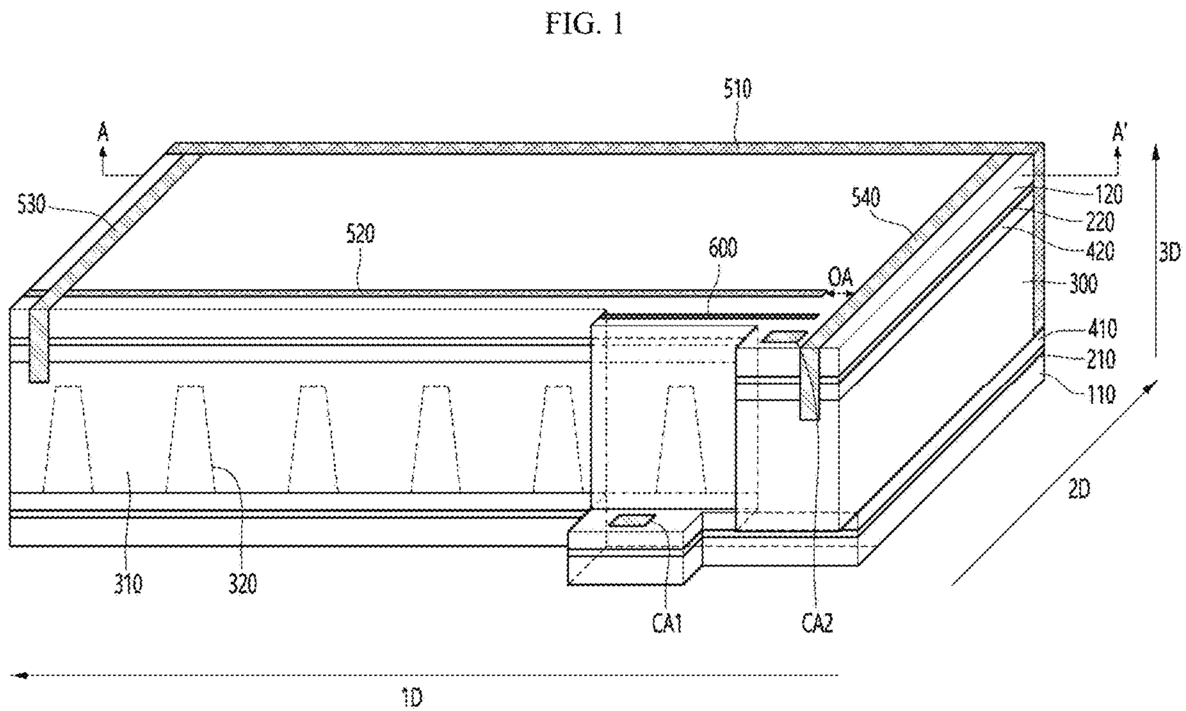
FIG. 1 is a perspective view of an optical path control member according to a first embodiment.

FIG. 1 is a diagram showing a perspective view of an optical path control member according to an embodiment.

Referring to FIG. 1, the optical path control member 1000 according to the embodiment includes a first substrate 110, a second substrate 120, a first electrode 210, a second electrode 220, and a light conversion unit 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

In addition, the first substrate 110 may be a curved or bent substrate. That is, the optical path control member including the first substrate 110 may also be formed to have flexible, curved, or bent characteristics. Accordingly, the optical path control member according to an embodiment may be changed in various designs.

The first substrate 110 may extend in a first direction 1D, a second direction 2D, and a third direction 3D.

Specifically, the first substrate 110 may include a first direction 1D corresponding to a length or width direction of the first substrate 110, a second direction 2D extending in a direction different from the first direction 1D and corresponding to the length or width direction of the first substrate 110 and corresponding to the length or width direction of the first substrate 110, and a third direction 3D extending in a direction different from the first direction 1D and the second direction 2D and corresponding to a thickness direction of the first substrate 110.

For example, the first direction 1D may be defined as a length direction of the first substrate 110. Also, the second direction 2D may be defined as a width direction of the first substrate 110 perpendicular to the first direction 1D. Also, the third direction 3D may be defined as a thickness direction of the first substrate 110. Alternatively, the first direction 1D may be defined as a width direction of the first substrate 110. Also, the second direction 2D may be defined as a length direction of the first substrate 110 perpendicular to the first direction 1D. Also, the third direction 3D may be defined as a thickness direction of the first substrate 110.

Hereinafter, for convenience of description, the first direction 1D is defined as the length direction of the first substrate 110. Also, the second direction 2D is defined as the width direction of the first substrate 110. Also, the third direction 3D is defined as the thickness direction of the first substrate 110.

The first substrate 110 may have a thickness within a predetermined range. For example, the first substrate 110 may have a thickness of 25 to 150 μm.

The first electrode 210 may be disposed on one surface of the first substrate 110. Specifically, the first electrode 210 may be disposed on an upper surface of the first substrate 110. That is, the first electrode 210 may be disposed between the first substrate 110 and the second substrate 120.

The first electrode 210 may include a transparent conductive material. For example, the first electrode 210 may include a conductive material having a light transmittance of about 80% or more. For example, the first electrode 210 may include a metal oxide such as indium tin oxide, indium zinc oxide, copper oxide, tin oxide, zinc oxide, titanium oxide, etc.

The first electrode 210 may have a thickness of about 10 nm to about 300 nm.

Alternatively, the first electrode 210 may include various metals to realize low resistance. For example, the first electrode 210 may include at least one of chromium (Cr), nickel (Ni), copper (Cu), aluminum (Al), silver (Ag), molybdenum (Mo). Gold (Au), titanium (Ti), and alloys thereof.

The first electrode 210 may be disposed on an entire surface of one surface of the first substrate 110. Specifically, the first electrode 210 may be disposed as a surface electrode on one surface of the first substrate 110. However, the embodiment is not limited thereto, and the first electrode 210 may be formed of a plurality of pattern electrodes having a constant pattern such as a mesh shape or a stripe shape.

For example, the first electrode 210 may include a plurality of conductive patterns. Specifically, the first electrode 210 may include a plurality of mesh lines that cross each other and a plurality of mesh openings formed by the mesh lines.

Accordingly, even if the first electrode 210 includes a metal, since the first electrode is not visually recognized from the outside, visibility may be improved. In addition, since the light transmittance is increased by the openings, the luminance of the optical path control member according to the embodiment may be improved.

The second substrate 120 may be disposed on the first substrate 110. Specifically, the second substrate 120 may be disposed on the first electrode 210 on the first substrate 110.

The second substrate 120 may include the same material as the first substrate 110 described above. For example, the second substrate 120 may include the same material as the first substrate 110 or a different material among the materials of the first substrate 110 described above.

In addition, the second substrate 120 may have a thickness equal to or similar to that of the first substrate 110 described above. For example, the second substrate 120 may have a thickness of 25 to 150 μm.

In addition, the second substrate 120 may also extend in the first direction 1D, the second direction 2D, and the third direction 3D to correspond to the first substrate 110 described above. Hereinafter, for convenience of description, the first direction 1D is defined as the length direction of the second substrate 120. Also, the second direction 2D is defined as the width direction of the second substrate 120. Also, the third direction 3D is defined as the thickness direction of the second substrate 120.

The second electrode 220 may be disposed on one surface of the second substrate 120. In detail, the second electrode 220 may be disposed on a lower surface of the second substrate 120. That is, the second electrode 220 may be disposed on a surface of the second substrate 120 facing the first substrate 110. That is, the second electrode 220 may be disposed to face the first electrode 210 on the first substrate 110. That is, the second electrode 220 may be disposed between the first electrode 210 and the second substrate 120.

The second electrode 220 may include a material that is the same as or similar to that of the first electrode 210 described above. For example, the second electrode 220 may include a material that is the same as or different from that of the first electrode 210 among the materials of the first electrode 210 described above.

In addition, the second electrode 220 may be formed to have a thickness the same as or similar to that of the first electrode 210. For example, the second electrode 220 may have a thickness of about 10 nm to about 300 nm. In addition, the second electrode 220 may be formed in a shape the same as or similar to that of the first electrode 210 described above. For example, the second electrode 220 may be disposed as a surface electrode or a plurality of pattern electrodes.

The first substrate 110 and the second substrate 120 may have the same or different sizes.

Specifically, a first length extending in the first direction 1D of the first substrate 110 may have a size equal to or similar to a second length extending in the first direction 1D of the second substrate 120.

For example, the first length and the second length may have a size of 300 mm to 400 mm.

In addition, a first width extending in the second direction 2D of the first substrate 110 may have the same or similar size as a second width extending in the second direction of the second substrate 120.

For example, the first width and the second width may have a size of 150 mm to 200 mm.

In addition, the first substrate 110 and the second substrate 120 may be formed in different areas.

Figure 2:
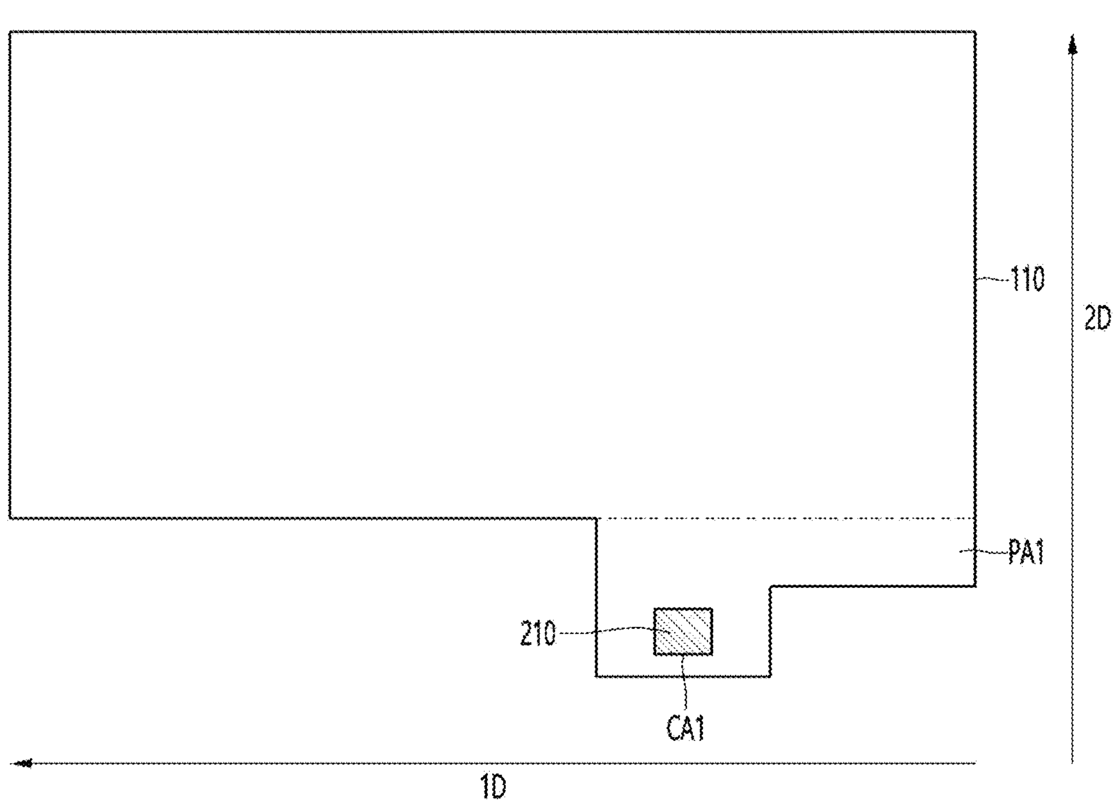
FIG. 2 is a top view of a first substrate of an optical path control member according to an embodiment.
Figure 3:
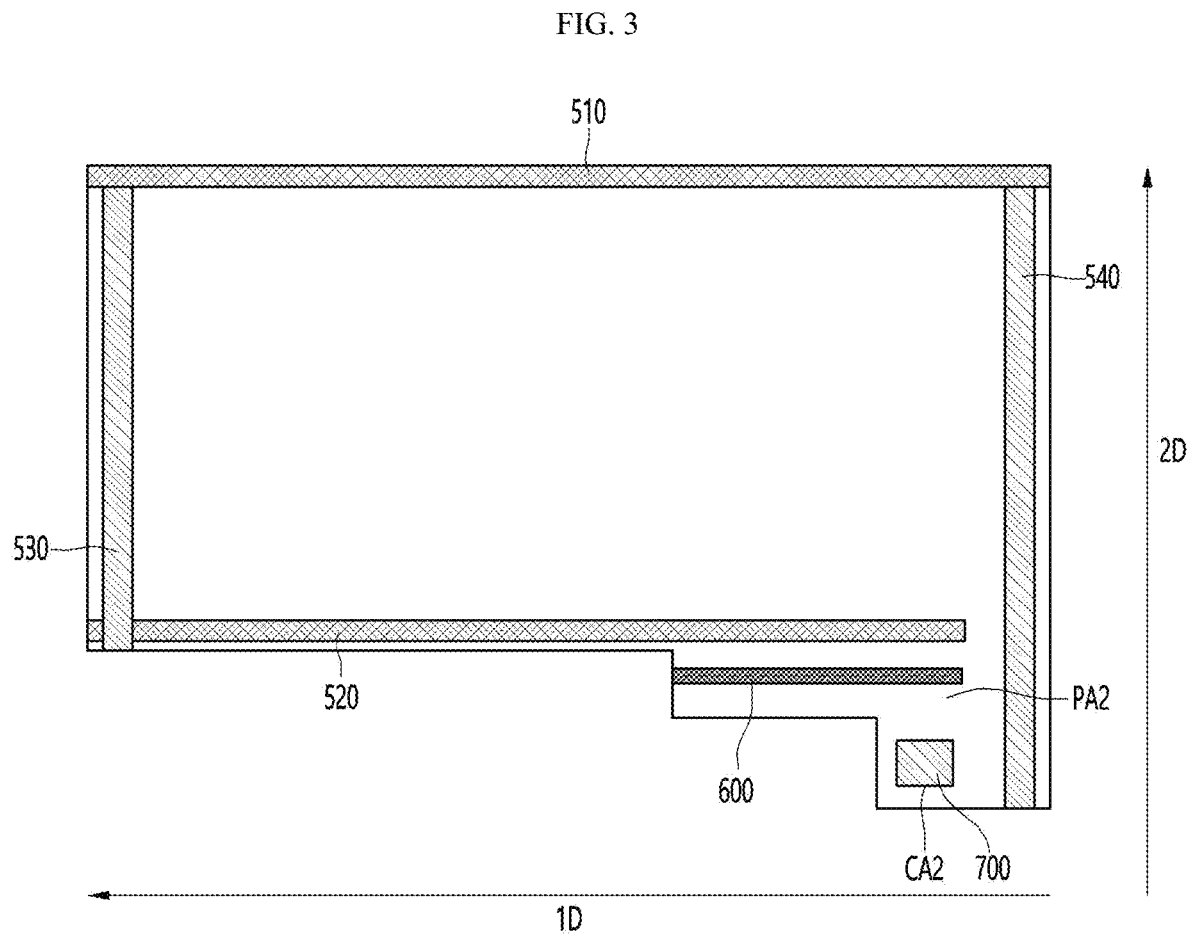
Figure 4:
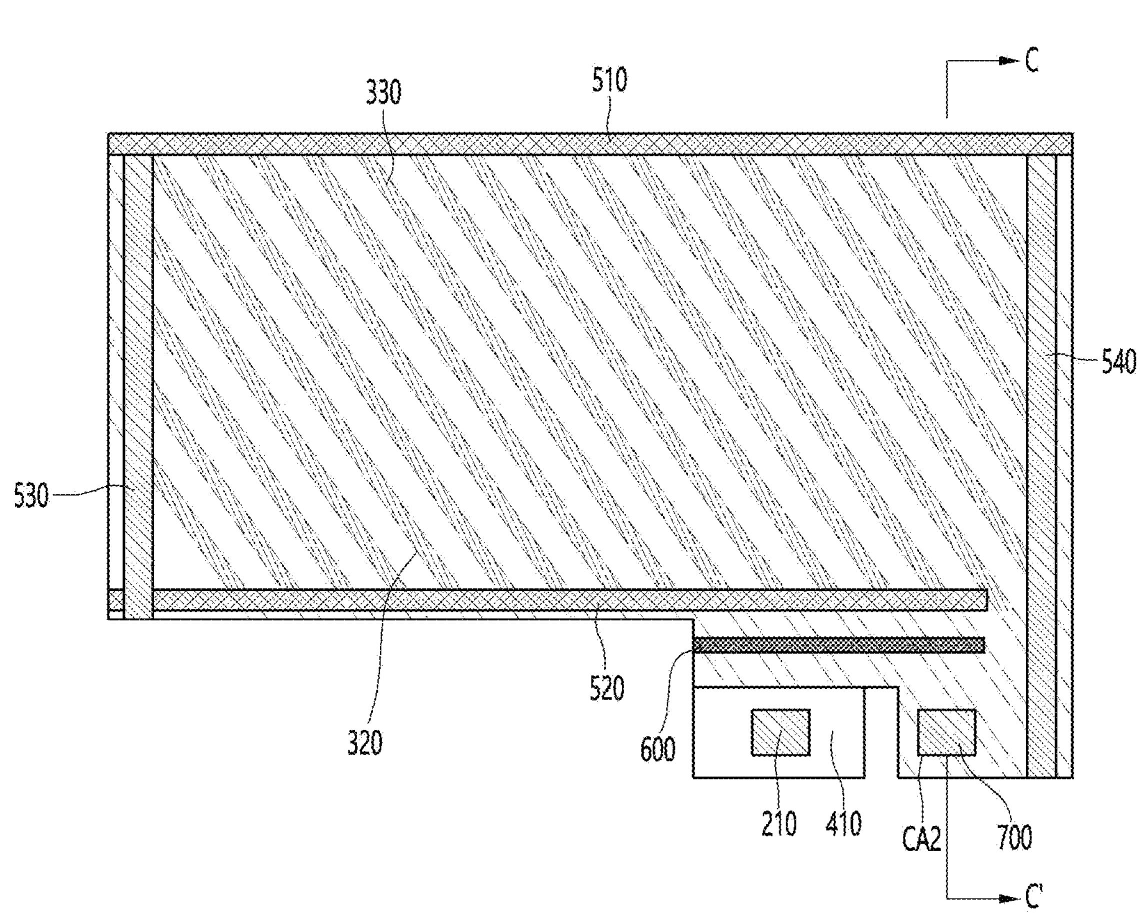
FIG. 4 is a top view of a second substrate in which a first substrate and a second substrate of an optical path control member are combined according to an embodiment.

Specifically, the first substrate 110 and the second substrate 120 may include protrusions. Referring to FIGS. 2 and 3, the first substrate 110 may include a first protrusion PA1, and the second substrate 120 may include a second protrusion PA2. The first protrusion PA1 and the second protrusion PA2 may be disposed to be misaligned with each other.

That is, the first protrusion PA1 and the second protrusion PA2 do not overlap in the third direction 3D.

Alternatively, an embodiment is not limited thereto. For example, the first protrusion PA1 and the second protrusion PA2 may include an overlapping region and a non-overlapping region. That is, the first protrusion PA1 and the second protrusion PA2 may include an overlapping region and a non-overlapping region in the third direction.

In this case, the first protrusion PA1 and the second protrusion PA2 may have different areas. That is, the first substrate 110 and the second substrate 120 may have different sizes by the difference in sizes of the protrusions.

Connection regions connected to an external printed circuit board or a flexible printed circuit board may be formed on the first protrusion PA1 and the second protrusion PA2, respectively.

Specifically, a first connection region CA1 may be disposed on the first protrusion PA1, and a second connection region CA2 may be disposed on the second protrusion PA2. When the first protrusion PA1 and the second protrusion PA2 are disposed at positions that are misaligned from each other, the first connection region CA1 and the second connection region CA2 may be disposed not to overlap each other in the third direction 3D.

A conductive material may be exposed on upper surfaces of the first connection region CA1 and the second connection region CA2, respectively. For example, a first electrode 210 may be exposed on the first connection region CA1, and a conductive material may be exposed on the second connection region CA2. That is, a cutting region for filling the conductive material 700 is formed in the second protrusion PA2. The second connection region CA2 may be formed by filling the cutting region with a conductive material.

Accordingly, the optical path control member may be electrically connected to an external printed circuit board or a flexible printed circuit board through the first connection region CA1 and the second connection region CA2.

For example, a pad part may be disposed on the first connection region CA1 and the second connection region CA2. A conductive adhesive including at least one of an anisotropic conductive film ACF and an anisotropic conductive paste ACP may be disposed between the pad part and the (flexible) printed circuit board. Accordingly, the optical path control member may be connected to the external printed circuit board.

Alternatively, a conductive adhesive including at least one of an anisotropic conductive film ACF and an anisotropic conductive paste ACP may be disposed between the first connection region CA1 and the second connection region CA2 and the (flexible) printed circuit board. Accordingly, the optical path control member may be connected to the external printed circuit board without the pad part.

A light conversion unit 300 may be disposed between the first substrate 110 and the second substrate 120. Specifically, the light conversion unit 300 may be disposed between the first electrode 210 and the second electrode 220.

An adhesive layer or a buffer layer may be disposed between the light conversion unit 300 and the first substrate 110 or between the light conversion unit 300 and the second substrate 120. The first substrate 110, the second substrate 120, and the light conversion unit 300 may be adhered by the adhesive layer and/or the buffer layer.

For example, an adhesive layer 410 is disposed between the first electrode 210 and the light conversion unit 300. Accordingly, the first substrate 110 and the light conversion unit 300 may be adhered to each other.

The adhesive layer 410 may have a thickness within a predetermined range. For example, the adhesive layer 410 may have a thickness of about 10 μm to about 30 μm.

Also, a buffer layer 420 is disposed between the second electrode 220 and the light conversion unit 300. Accordingly, adhesion between the second electrode 220 and the light conversion unit 300 including different materials may be improved.

The buffer layer 420 may have a thickness within a set range. For example, the buffer layer 420 may have a thickness of less than 1 μm.

Figure 5:
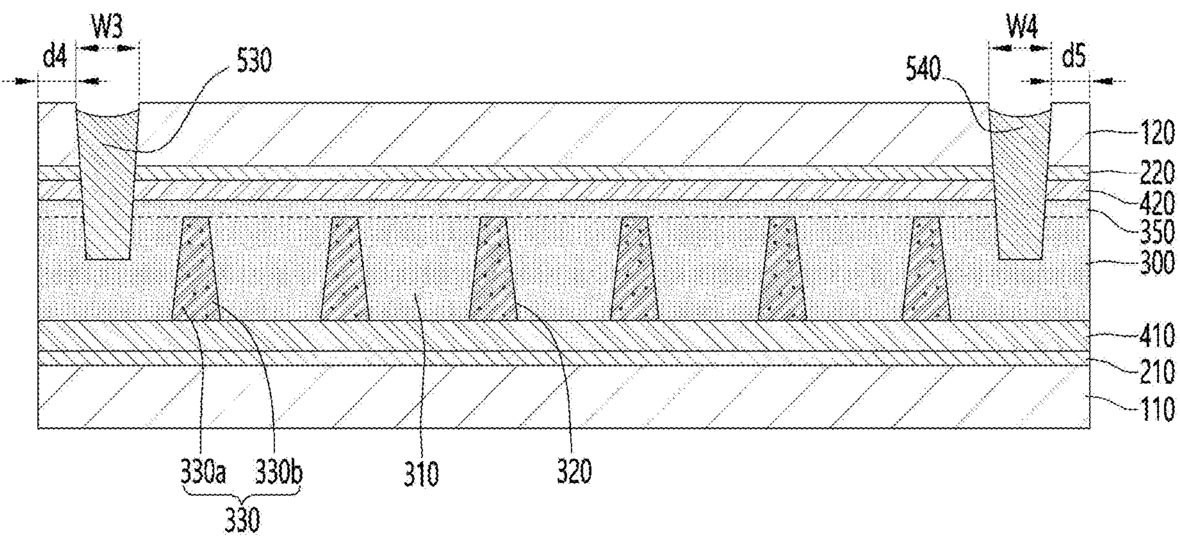
FIGS. 5 and 6 are cross-sectional views taken along a A-A' region of FIG. 1.
Figure 6:
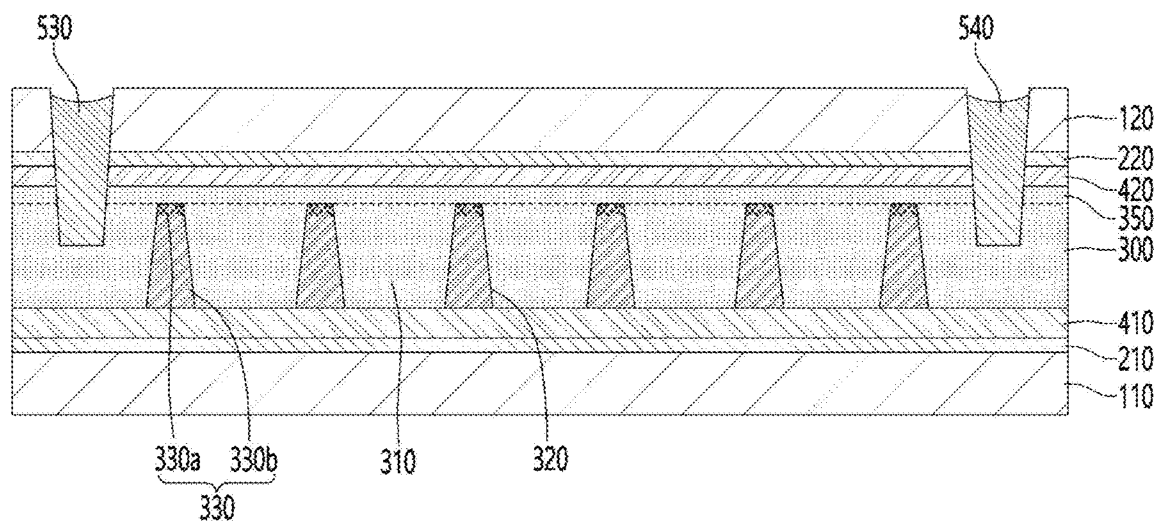

The light conversion unit 300 may include a plurality of partition wall parts 310 and a accommodating part 320. A light conversion material 330 including the light conversion particles moving according to the application of the voltage and the dispersion for dispersing the light conversion particles may be disposed in the accommodating part 320. The light transmission characteristics of the optical path control member may be changed by the light conversion particles. FIGS. 5 and 6 are cross-sectional views taken along a A-A' region of FIG. 1.

Referring to FIGS. 5 and 6, the light conversion unit 300 may include a partition wall part 310 and an accommodating part 320.

The partition wall part 310 may be defined as a partition wall region that divides a plurality of accommodating parts. The partition wall part 310 may transmit light. Thus, light emitted from the direction of the first substrate 110 or the second substrate 120 may transmit the partition wall part.

The partition wall part 310 and the accommodating part 320 may be disposed to have different widths. For example, a width of the partition wall part 310 may be greater than a width of the accommodating part 320.

The accommodating part 320 may be disposed to extend in one direction.

For example, the accommodating part 320 may extend in a direction different from the first and second directions 1D and 2D. That is, the accommodating part 320 may be tilted with respect to the first and second directions 1D and 2D. For example, the accommodating part 320 may extend in a direction between the first and second directions 1D and 2D.

The accommodating part 320 is disposed to be tilted at an inclination angle set with the first direction 1D and the second direction 2D. Accordingly, when the optical path control member and the display panel are combined to form a display device, it is possible to inhibit a moiré phenomenon caused by overlapping the accommodating part of the optical path control member and a pattern part of the display panel.

However, the embodiment is not limited thereto, and the accommodating part 320 may be disposed extending in the second direction 2D without being tilted.

In addition, the accommodating part 320 may be formed in a shape that extends from the first electrode 210 to the second electrode 220 and narrows the width.

The partition wall part 310 and the accommodating part 320 may be disposed alternately with each other. That is, each of the partition wall parts 310 is disposed between the accommodating parts 320 adjacent to each other. Also, each of the accommodating parts 320 is disposed between the partition wall parts 310 adjacent to each other.

The partition wall part 310 may include a transparent material. The partition wall part 310 may include a material capable of transmitting light.

The partition wall part 310 may include a resin material. For example, the partition wall part 310 may include a photocurable resin material. For example, the partition wall part 310 may include a UV resin or a transparent photoresist resin. Alternatively, the partition wall part 310 may include a urethane resin or an acrylic resin.

The accommodating part 320 may be formed to partially pass through the light conversion unit 300. Accordingly, the accommodating part 320 is disposed in contact with the adhesive layer 410. Also, the accommodating part 320 is disposed to be spaced apart from the buffer layer 420. Accordingly, a base part 350 may be formed between the accommodating part 320 and the buffer layer 420.

A light conversion material 330 including a light conversion particle **330*a* and a dispersion liquid 330*b* for dispersing the light conversion particle 330*a* may be disposed in the accommodating part 320**.

The dispersion liquid **330*b* may be a material for dispersing the light conversion particles 330*a*. The dispersion liquid 330*b* may include a transparent material. The dispersion liquid 330*b* may include a non-polar solvent. In addition, the dispersion liquid 330*b* may include a material capable of transmitting light. For example, the dispersion liquid 330*b*** may include at least one of a halocarbon-based oil, a paraffin-based oil, and an isopropyl alcohol.

The light conversion particles **330*a* may be disposed to disposed in the dispersion liquid 330*b*. Specifically, the plurality of light conversion particles 330*a* may be disposed in the dispersion liquid 330*b*** to be spaced apart from each other.

The light conversion particle **330*a* may include a material capable of absorbing light. That is, the light conversion particle 330*a* may be a light-absorbing particle. In addition, the light conversion particle 330*a* may have a color. For example, the light conversion particle 330*a* may have a black-based color. For example, the light conversion particle 330*a*** may include carbon black particles.

The light conversion particle **330*a* may have a polarity because the surface thereof is charged. For example, the surface of the light conversion particle 330*a* may be negatively charged. Accordingly, the light conversion particle 330*a* may be moved toward the first electrode 210 or the second electrode 220** by the application of a voltage.

The light transmittance of the accommodating part 320 may be changed by the light conversion particles **330*a*. Accordingly, the accommodating part 320 may be converted into a light blocking part and a light transmitting part. That is, the light transmittance passing through the accommodating part 320 may be changed by the dispersion and aggregation of the light conversion particles 330*a***.

For example, the optical path control member may be changed from a first mode to a second mode or from the second mode to the first mode by a voltage applied to the first electrode 210 and the second electrode 220.

Specifically, in the first mode, the accommodating part 320 becomes a light blocking part. Thereby, light at a specific angle may be blocked. That is, since the viewing angle of the user viewed from the outside is narrowed, the optical path control member may be driven in a privacy mode.

Also, in the second mode, the accommodating part 320 becomes a light transmitting part. Accordingly, light may be transmitted from both the partition wall part 310 and the accommodating part 320. That is, since the viewing angle of the user viewed from the outside is widened, the optical path control member may be driven in a publication mode.

The conversion from the first mode to the second mode may be implemented by the movement of the light conversion particle **330*a* of the accommodating part 320. That is, the light conversion particle 330*a* has an electric charge on its surface. Also, the light conversion particle 330*a*** may be moved in the direction of the first electrode or the second electrode by the application of a voltage.

For example, when a voltage is not externally applied to the optical path control member, the optical conversion particles **330*a* are uniformly dispersed in the dispersion liquid 330*b*. Accordingly, the light of the accommodating part 320 may be blocked by the optical conversion particles 330*a*. Accordingly, in the first mode, the accommodating part 320** may be driven as a light blocking part.

Also, when a voltage is externally applied to the optical path control member, the light conversion particles **330*a* may be moved. For example, the light conversion particle 330*a* may be moved in a direction toward one end or the other end of the accommodating part 320 by the voltage applied through the first electrode 210 and the second electrode 22. That is, the light conversion particle 330*a* may be moved in a direction toward the first electrode 210 or the second electrode 220**.

For example, when a voltage is applied to the first electrode 210 and/or the second electrode 220, an electric field is formed between the first electrode 210 and the second electrode 220. In addition, the light conversion particle **330*a*, which is in a negatively charged state, may be moved toward an electrode having a positive electrode among the first electrode 210 and the second electrode 220 using the dispersion liquid 330*b*** as a medium.

For example, referring to FIG. 5, in an initial mode or when a voltage is not applied to the first electrode 210 and/or the second electrode 220, the light conversion particle **330*a* is uniformly dispersed in the dispersion liquid 330*b*, thereby driving the accommodating part 320** as a light blocking part.

In addition, referring to FIG. 6, when a voltage is applied to the first electrode 210 and/or the second electrode 220, the light conversion particle **330*a* may be moved in a direction toward the second electrode 220 in the dispersion liquid 330*b*. That is, the light conversion particle 330*a* is moved in one direction, so that the accommodating part 320** may be driven as a light transmitting part.

Accordingly, the optical path control member according to the embodiment may be driven in two modes according to the user's surrounding environment. That is, when the user wants to transmit light at a specific viewing angle, the accommodating part may be driven as a light blocking part. Alternatively, when the user requests a wide viewing angle and high luminance, a voltage is applied, and accordingly, the accommodating part may be driven as a light transmitting part.

Accordingly, the optical path control member according to an embodiment may be implemented in two modes according to a user's request. Accordingly, the optical path control member may drive the optical path member without being affected by the user's environment.

Referring to FIG. 1, the optical path control member may include a sealing part. The sealing part may seal the optical conversion material disposed in the accommodating part 320.

The sealing part may include a sealing part extending in the first direction 1D and a sealing part extending in the second direction 2D. For example, the sealing part may include a first sealing part 510 and a second sealing part 520 extending in a first direction 1D. The first sealing part 510 and the second sealing part 520 may be disposed to face each other in the second direction 2D.

In addition, the sealing part may include a third sealing part 530 and a fourth sealing part 540 extending in the second direction 2D. The third sealing part 530 and the fourth sealing part 540 may be disposed to face each other in the first direction 1D.

The first sealing part 510, the second sealing part 520, the third sealing part 530, and the fourth sealing part 540 may be formed by a process of manufacturing the optical path control member.

The first sealing part 510, the second sealing part 520, the third sealing part 530, and the fourth sealing part 540 have different positions and roles of sealing parts, and have different order of formation. Accordingly, the first sealing part 510, the second sealing part 520, the third sealing part 530, and the fourth sealing part 540 may have different widths.

Figure 7:
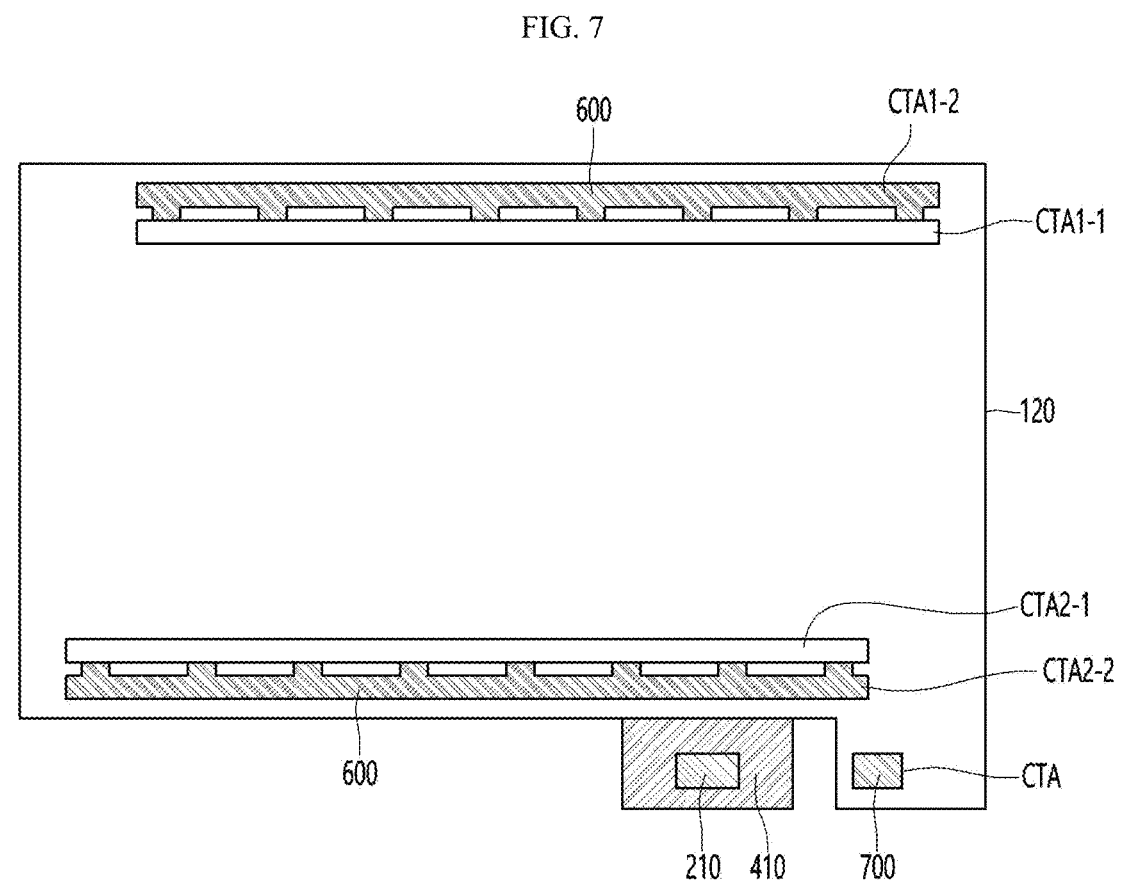
Figure 8:
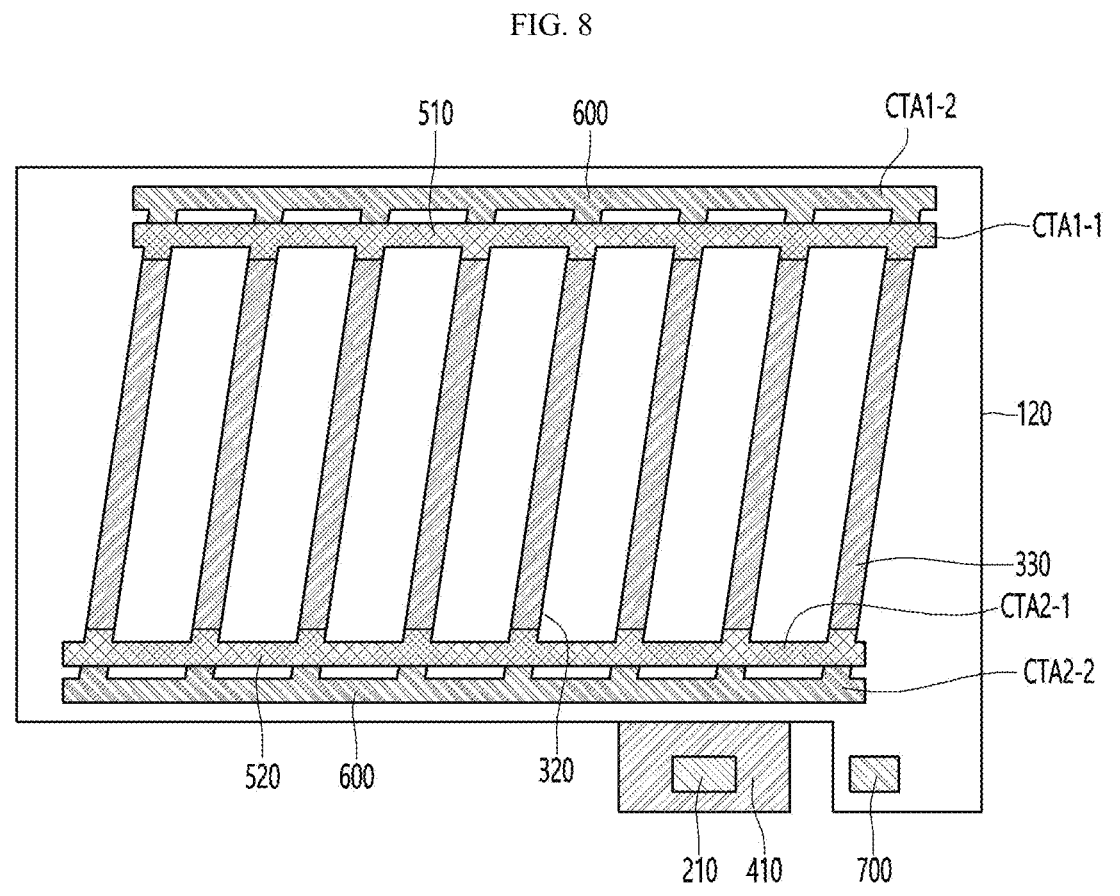
Figure 9:
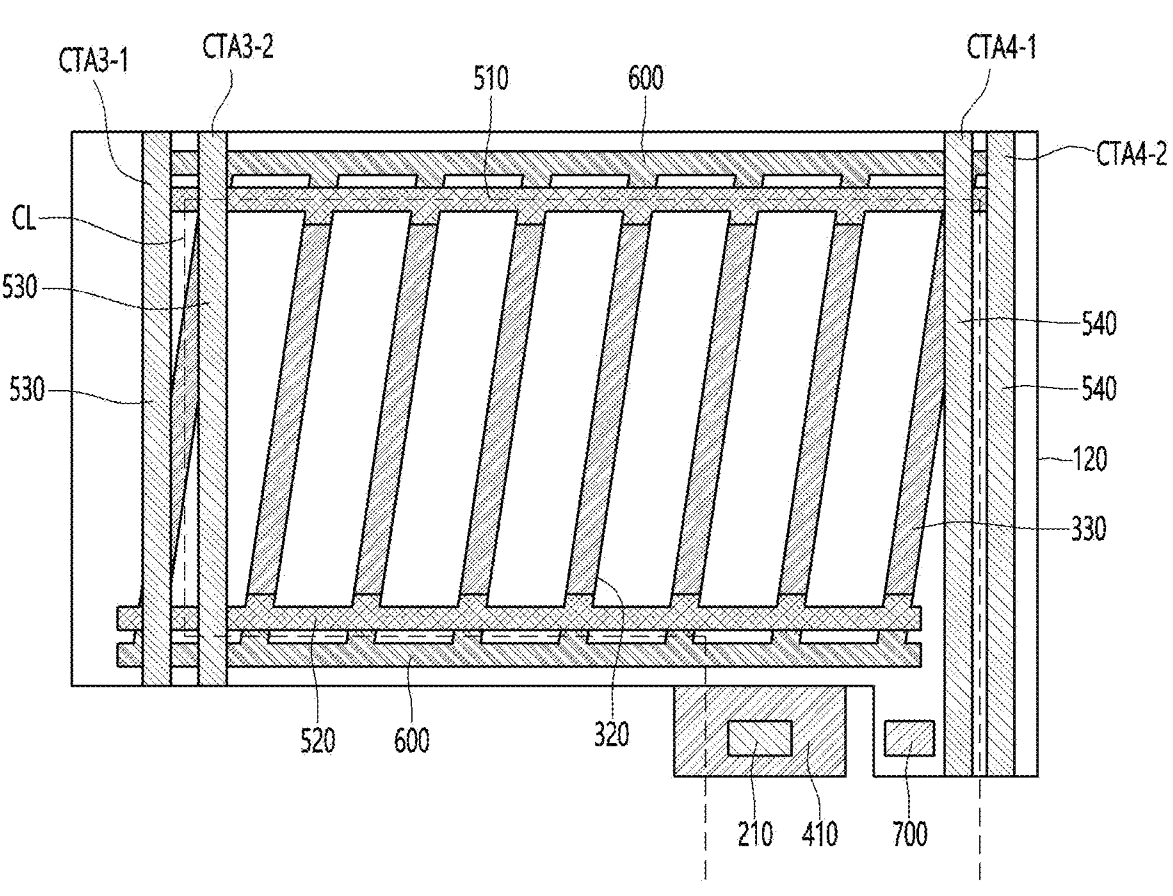

FIGS. 7 to 9 are views for explaining a process of forming the sealing part.

Referring to FIG. 7, a plurality of cutting regions may be formed in the second substrate 120. The cutting region may be formed by cutting at least one of the second substrate 120, the second electrode 220, the buffer layer 420, and the light conversion unit 300.

A first-first cutting region CTA1-1 and a first-second cutting region CTA1-2 may be formed at an upper side of the second substrate 120. In addition, a second-first cutting region CTA2-1 and a second-second cutting region CTA2-2 may be formed at a lower side of the second substrate 120. Here, the lower side of the second substrate 120 is positioned to be closer to the first connection region and the second connection region than a position of the upper side.

In addition, a cutting region CTA may also be formed in a region where the connection region to which the external circuit board is connected is formed.

Each of the first-second cutting region CTA1-2 and the second-second cutting region CTA2-2 is filled with a resin material such as epoxy. Accordingly, a dam part 600 may be formed in the first-second cutting region CTA1-2 and the second-second cutting region CTA2-2. When filling the inside of the accommodating part 320 with the light conversion material 330, the dam part 600 may inhibit the light conversion material 330 from overflowing to the outside of the accommodating part 320. That is, the light conversion material 330 may be injected only between the dam parts 600 by the dam part 600.

In addition, the cutting region CTA is filled with a conductive material 700, which can form a connection region.

Subsequently, referring to FIG. 8, the light conversion material 330 may be filled through the first-first cutting region CTA1-1 and the second-first cutting region CTA2-1. Specifically, the light conversion material may be injected into the first-first cutting region CTA1-1, and the light conversion material may be sucked in the second-first cutting region CTA2-1. Accordingly, the light conversion material 330 may be injected into the accommodating part 320. That is, the first-first cutting region CTA1-1 may be an injection part into which the light conversion material 330 is injected, and the second-first cutting region CTA2-1 may be a suction part through which the light conversion material 330 is sucked.

Subsequently, a resin material may be filled in the first-first cutting region CTA1-1 and the second-first cutting region CTA2-1 in order to seal the light conversion material 330. Accordingly, a first sealing part 510 may be formed in the first-first cutting region CTA1-1, and a second sealing part 520 may be formed in the second-first cutting region CTA2-1. The light conversion material 330 may be sealed in the inside of the accommodating part 320 by the first sealing part 510 and the second sealing part 520.

Subsequently, referring to FIG. 9, a cutting region may be further formed in the second substrate 120. In detail, a third-first cutting region CTA3-1 and a third-second cutting region CTA3-2 may be formed at a left side of the second substrate 120. In addition, a fourth-first cutting region CTA4-1 and a fourth-second cutting region CTA4-2 may be formed at a right side of the second substrate 120. Here, a position of a right side of the second substrate 120 is disposed closer to the first and second connection regions than a position of a left side thereof.

Each of the third-first cutting region CTA3-1 and the third-second cutting region CTA3-2 is filled with a resin material such as epoxy, respectively. In addition, each of the fourth-first cutting region CTA4-1 and the fourth-second cutting region CTA4-2 is filled with a resin material such as epoxy.

Accordingly, a third sealing part 530 may be formed in the third-first cutting region CTA3-1 and the third-second cutting region CTA3-2, and a fourth sealing part 540 may be formed in the fourth-first cutting region CTA4-1 and the fourth-second cutting region CTA4-2. The third sealing part 530 and the fourth sealing part 540 may inhibit impurities such as moisture penetrating toward a side surface of the optical path control member.

In this case, the first-first cutting region CTA1-1, the first-second cutting region CTA1-2, the second-first cutting region CTA2-1, and the second-second cutting region CTA2-2 formed at the upper and lower sides of the second substrate may be formed to have widths wider than that of the third-first cutting region CTA3-2, the third-second cutting region CTA3-2, the fourth-first cutting region CTA4-1, and the fourth-second cutting region CTA4-2 formed at the left and right sides of the second substrate.

The first-first cutting region CTA1-1 may be formed to have a wide width for injecting the light conversion material. In addition, the first-second cutting region CTA1-1 may be formed to have a wide width for suctioning the light conversion material. In addition, the second-first cutting region CTA2-1 and the second-second cutting region CTA2-2 may be formed to have a wide width for inhibiting overflow of the light conversion material.

That is, the first-first cutting region CTA1-1, the first-second cutting region CTA1-2, the second-first cutting region CTA2-1, and the second-second cutting region CTA2-2 may be formed relatively wide to proceed with a process in each region.

On the other hand, the third-first cutting region CTA3-1, the third-second cutting region CTA3-2, the fourth-first cutting region CTA4-1, and the fourth-second cutting region CTA4-2 are regions formed after filling the light conversion material. Accordingly, the third-first cutting region CTA3-1, the third-second cutting region CTA3-2, the fourth-first cutting region CTA4-1, and the fourth-second cutting region CTA4-2 may be formed to have a relatively small width to inhibit leakage of the light conversion material.

Accordingly, a great amount of the resin material is also filled in the first-first cutting region CTA1-1, the first-second cutting region CTA1-2, the second-first cutting region CTA2-1, and the second-second cutting region CTA2-2, which are formed to have a relatively wide width. Accordingly, in a process of filling the resin material, the resin material may overflow to the outside of the cutting region. Accordingly, stains may be generated on the optical path control member cut along the cutting region CL. In addition, light transmittance of the optical path control member may also be affected.

Therefore, hereinafter, an optical path control member including a sealing part having a width of a range set to solve the above problem will be described.

Figure 10:
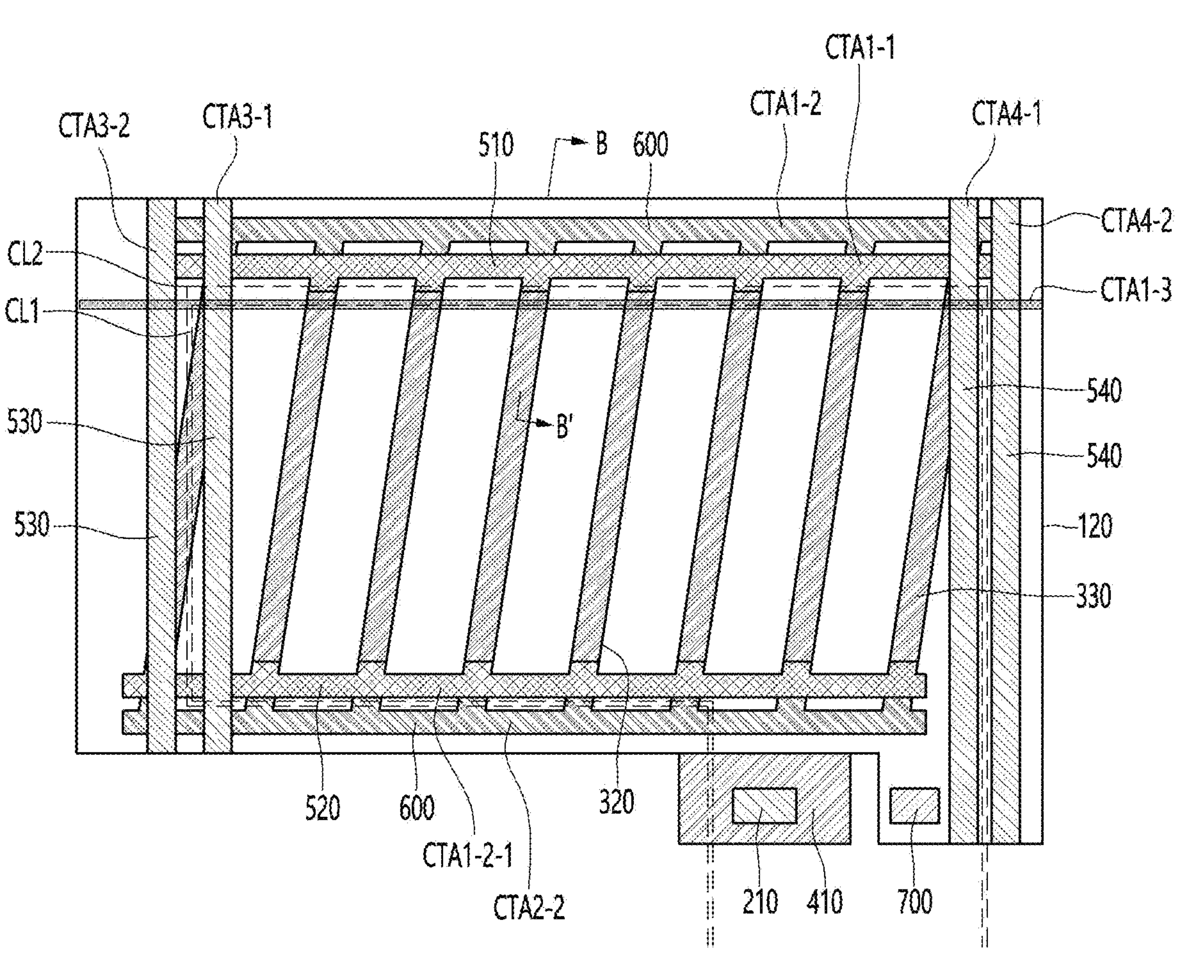
FIGS. 10 and 11 are views for explaining a process of manufacturing an optical path control member according to an embodiment.
Figure 11:
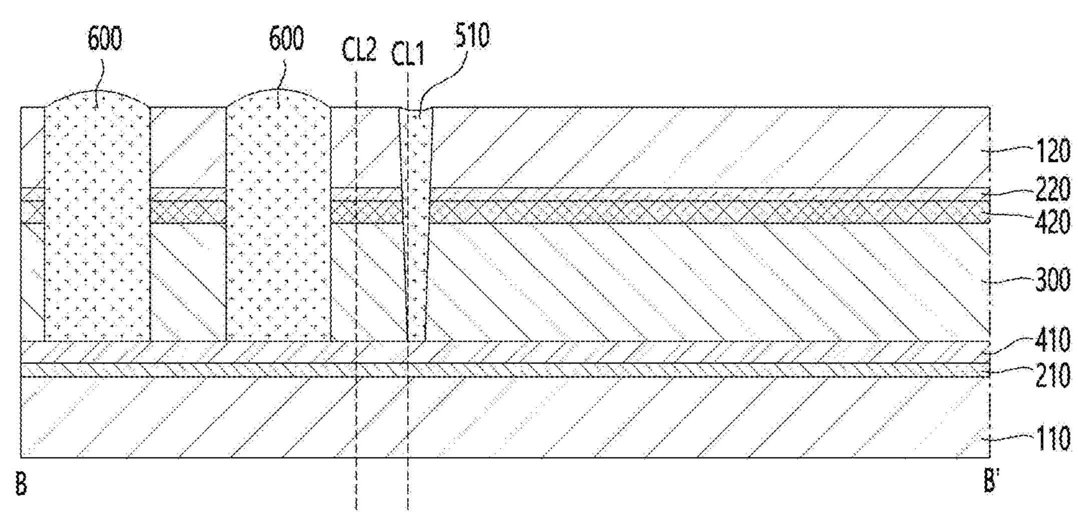

FIGS. 10 and 11 are views for explaining a process of manufacturing an optical path control member according to an embodiment. FIG. 11 is a cross-sectional view taken along a B-B' region of FIG. 10.

Referring to FIGS. 10 and 11, a first-third cutting region CTA1-3 may be further formed to manufacture the optical path control member according to the embodiment. The first-third cutting region CTA1-3 may be filled with a resin material such as an epoxy. Accordingly, another first sealing part 510 may be formed in the first-third cutting region CTA1-3.

The third cutting region CTA3 may have a width smaller than widths of the first-first cutting region CTA1-1 and the first-second cutting region CTA1-2. That is, the third cutting region CTA3 is formed after the light conversion material is injected into the accommodating part. Accordingly, a width of the third cutting region CTA3 may be smaller than widths of the first-first cutting region CTA1-1 and the first-second cutting region CTA1-2 for forming the injection part and the dam part.

Accordingly, when the resin material is injected into the third cutting region CTA3, a relatively small amount of the resin material is filled. Accordingly, it is possible to inhibit the light conversion material from overflowing to the outside of the third cutting region CTA3 due to an increase in the injection amount of the resin material.

Subsequently, the optical path control member may be cut along the first cutting line CL1 or the second cutting line CL2.

Figure 14:
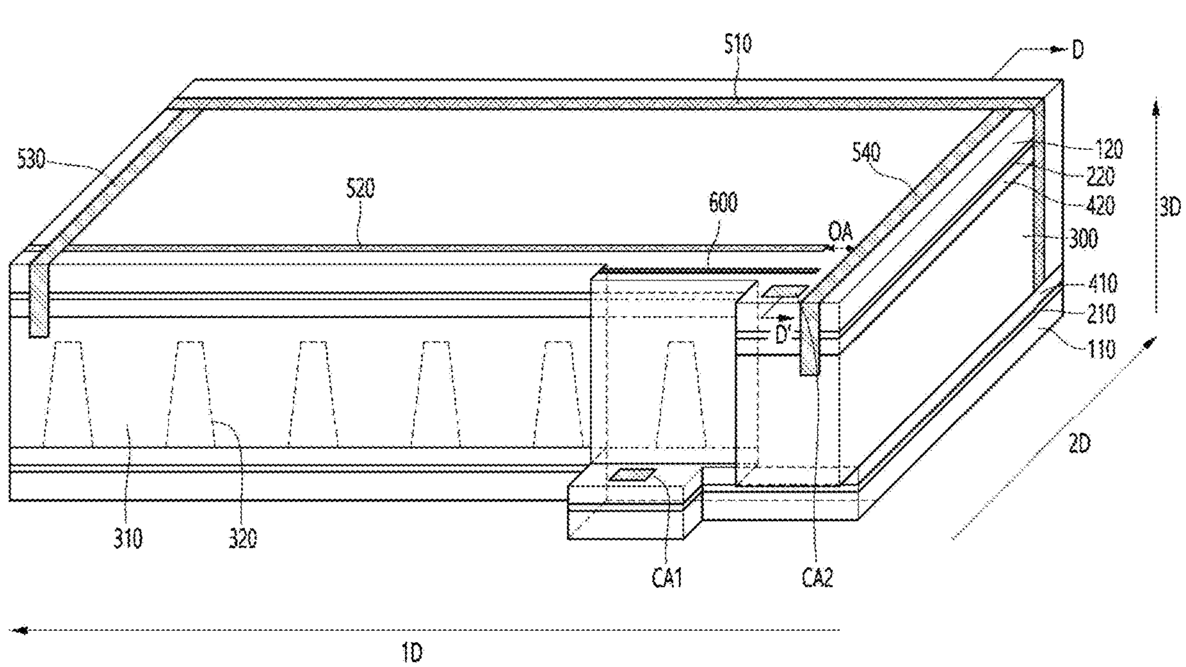
FIG. 14 is a perspective view of an optical path control member according to a second embodiment.

The optical path control member according to the first embodiment of FIG. 1 is formed through the first cutting line CL1. Also, the optical path control member according to the second embodiment of FIG. 14 is formed through the second cutting line CL2.

Hereinafter, a sealing part of the optical path control member according to the first embodiment will be described in detail with reference to FIGS. 5, 6, 12, and 13. The optical path control member according to the first embodiment is an optical path control member cut along the first cutting line CL1 of FIGS. 10 and 11 described above.

Figure 12:
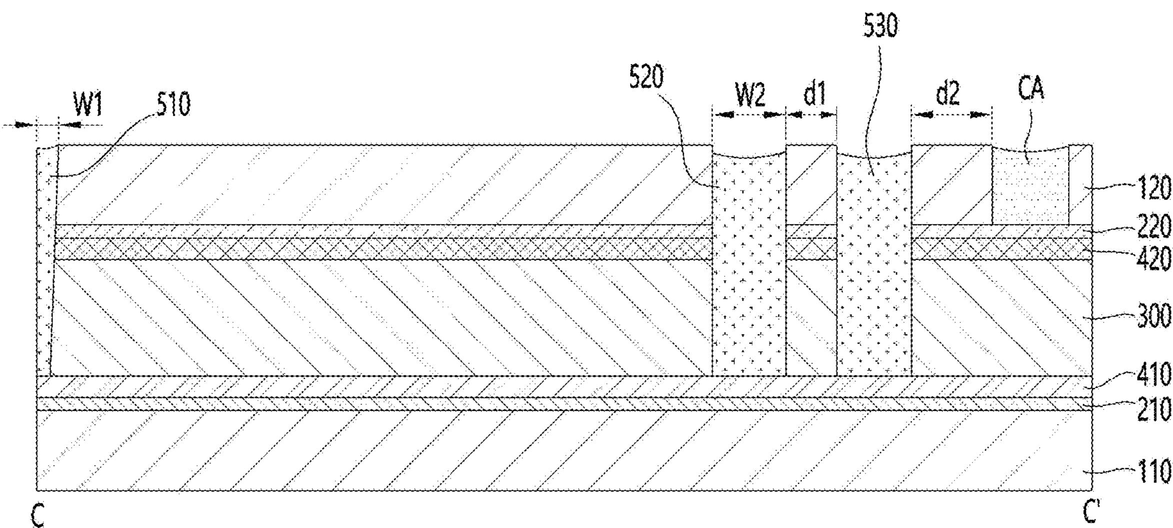
FIGS. 12 and 13 are cross-sectional views taken along a C-C' region of FIG. 4.

First, referring to FIG. 12, the first sealing part 510 may have a width smaller than that of the second sealing part 520 and the dam part 600. Here, the width of the first sealing part 510 may be defined as a surface hole of the second substrate 120. That is, the width of the first sealing part 510 may be defined as a long width of the first sealing part 510.

For example, a width w1 of the first sealing part 510 may be less than or equal to 0.2 mm. Specifically, the width of the first sealing part 510 may be less than or equal to 0.17 mm. More specifically, the width of the first sealing part 510 may be less than or equal to 0.15 mm. More specifically, the width of the first sealing part 510 may be less than or equal to 0.10 mm.

When the width of the first sealing part 510 is greater than 0.2 mm, the width of the first sealing part 510 defined as a bezel region may increase, and thus the size of the optical path control member may increase. Also, when the first sealing part 510 formed by the first-third cutting region is formed, a stain may be formed on the optical path control member due to overflowing resin material forming the first sealing part 510.

A width w2 of the second sealing part 520 may be less than or equal to 0.5 mm. Specifically, the width of the second sealing part 520 may be less than or equal to 0.4 mm. More specifically, the width of the second sealing part 520 may be less than or equal to 0.3 mm.

When the width of the second sealing part 520 exceeds 0.5 mm, the width of the second sealing part 520 defined as a bezel region may increase, and thus the size of the optical path control member may increase. Also, when the second sealing part 520 formed by the second-first cutting region is formed, a stain may be formed on the optical path control member due to overflowing resin material forming the second sealing part 520.

A distance d1 between the second sealing part 520 and the dam part 600 may be less than or equal to 0.5 mm. Specifically, the distance d1 between the second sealing part 520 and the dam part 600 may be less than or equal to 0.4 mm. More specifically, the distance d1 between the second sealing part 520 and the dam part 600 may be less than or equal to 0.3 mm.

When the distance d1 between the second sealing part 520 and the dam part 600 exceeds 0.5 mm, the distance d1 between the second sealing part 520 defined as a bezel region increases, and thus the size of the optical path control member may increase.

A distance d2 between the dam part 600 and the connection region CA may be less than or equal to 1.0 mm. Specifically, the distance d2 between the dam part 600 and the connection region CA may be less than or equal to 0.7 mm. More specifically, the distance d2 between the dam part 600 and the connection region CA may be less than or equal to 0.5 mm.

When the distance d2 between the dam part 600 and the connection region CA exceeds 1.0 mm, the distance d2 between the dam part 600 and the connection region CA, which is defined as a bezel region may increase, so that the size of the optical path control member may increase.

Figure 13:
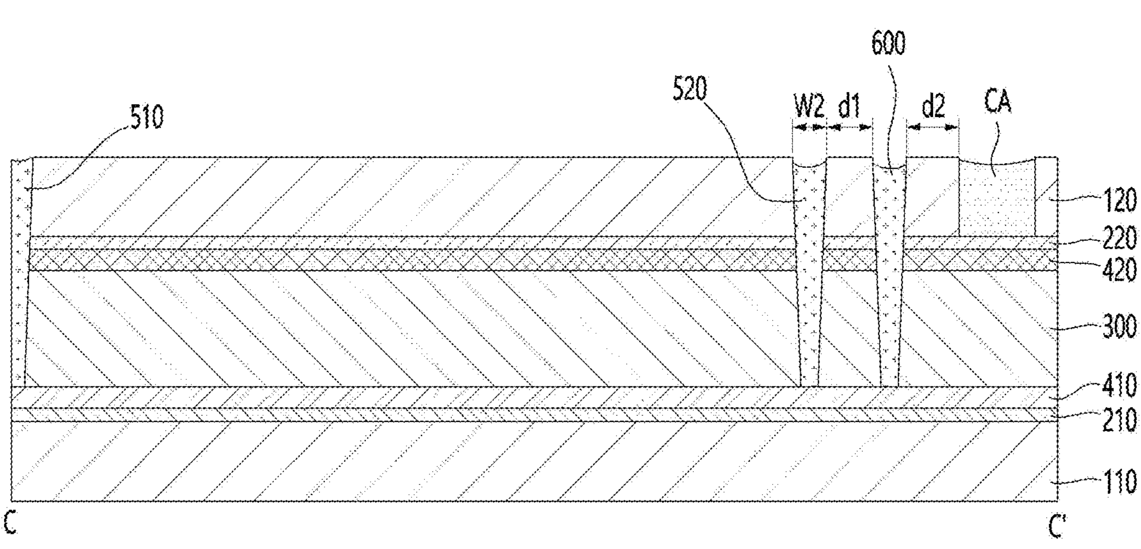

Meanwhile, referring to FIG. 13, the second sealing part 520 and the dam part 600 may have smaller widths. That is, when the second-first cutting region and the second-second cutting region are formed, the sizes of the second-first cutting region and the second-second cutting region may be adjusted. Accordingly, the widths of the second sealing part 520 and the dam part 600 may be reduced.

Accordingly, the width w2 of the second sealing part 520 may be less than or equal to 0.2 mm. Specifically, the width of the second sealing part 520 may be in the range of 0.1 mm to 0.2 mm.

When the width of the second sealing part 520 is less than 0.1 mm, it is difficult to sufficiently suction the light conversion material through a cutting region of the second sealing part 520. Accordingly, a processing time for filling the light conversion material may be increased. Also, a filling defect of the light conversion material may occur.

A region occupied by the second sealing part 520 may be reduced by forming the width of the second sealing part 520 to be 0.1 mm to 0.2 mm. Accordingly, the bezel region of a lower region of the optical path control member may be reduced.

The distance d1 between the second sealing part 520 and the dam part 600 may be less than or equal to 0.2 mm. Specifically, the distance d1 between the second sealing part 520 and the dam part 600 may be in a range of 0.1 mm to 0.2 mm.

When the distance d1 between the second sealing part 520 and the dam part 600 is less than 0.1 mm, the second sealing part 520 and the cutting region of the dam part 600 may contact each other due to a process error.

A region occupied by the distance between the second sealing part 520 and the dam part 600 may be reduced by forming the distance d1 between the second sealing part 520 and the dam part 600 to be 0.1 mm to 0.2 mm. Accordingly, the bezel region of the lower region of the optical path control member may be reduced.

The distance d2 between the dam part 600 and the connection region CA may be less than or equal to 0.3 mm. Specifically, the distance d2 between the dam part 600 and the connection region CA may be in a range of 0.1 mm to 0.3 mm.

When the distance d2 between the dam part 600 and the connection region CA is less than 0.1 mm, the dam part 600 and the cutting region of the connection region CA may contact each other due to a process error.

A region occupied by the distance between the dam part 600 and the connection region CA may be reduced by forming the distance d2 between the dam part 600 and the connection region CA to be 0.1 mm to 0.3 mm. Accordingly, the bezel region of the lower region of the optical path control member may be reduced.

Referring to FIGS. 5 and 6, the third sealing part 530 and the fourth sealing part 540 may have widths within a set range. Here, widths of the third sealing part 530 and the fourth sealing part 540 may be defined as surface holes of the second substrate 120. That is, widths of the third sealing part 530 and the fourth sealing part 540 may be defined as long widths of the third sealing part 530 and the fourth sealing part 540.

The widths of the third sealing part 530 and the fourth sealing part 540 may be less than or equal to the width of at least one of the first sealing part 510 and the second sealing part 520.

Specifically, the width of the sealing part of at least one of the third sealing part 530 and the fourth sealing part 540 may be less than or equal to 0.2 mm. Specifically, the width of at least one of the width w3 of the third sealing part 530 and the width w4 of the fourth sealing part 540 may be less than or equal to 0.17 mm. More specifically, the width of at least one sealing part of the third sealing part 530 and the fourth sealing part 540 may be less than or equal to 0.15 mm. More specifically, the width of at least one sealing part of the third sealing part 530 and the fourth sealing part 540 may be less than or equal to 0.10 mm.

When the widths of the third sealing part 530 and the fourth sealing part 540 are more than 0.2 mm, the widths of the third sealing part 530 and the fourth sealing part 540 defined as bezel regions may increase, and thus the size of the optical path control member may increase.

Hereinafter, an optical path control member according to a second embodiment will be described with reference to FIGS. 5, 14, and 15. In the description of the optical path control member according to the second embodiment, a description similar to the description of the optical path control member according to the first embodiment will be omitted, and the same reference numerals are assigned to the same configuration.

The optical path control member according to the second embodiment is an optical path control member cut along the second cutting line CL2 of FIGS. 10 and 11.

Figure 15:
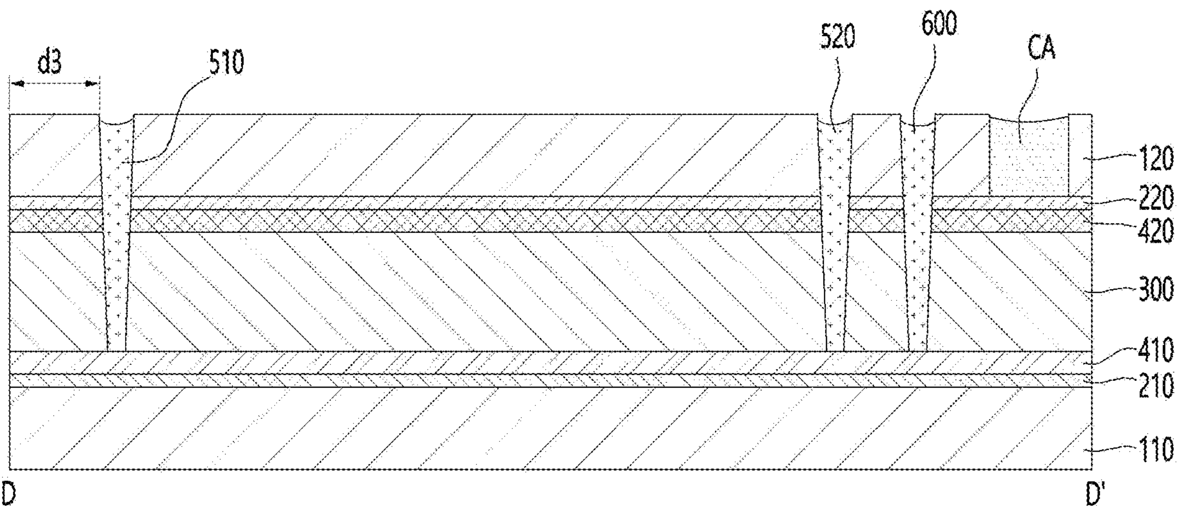
FIG. 15 is a cross-sectional view taken along a D-D' region of FIG. 14.

Referring to FIGS. 14 and 15, in the optical path control member according to the second embodiment, the first sealing part 510 may be disposed inside the optical path control member. That is, unlike the optical path control member according to the first embodiment in which the first sealing part 510 is exposed, the optical path control member according to the second embodiment may be disposed by inserting the first sealing part 510 inside the optical path control member.

Accordingly, the first sealing part 510 may be disposed to be spaced apart from an end of the optical path control member or the second substrate.

Specifically, the distance d3 between the first sealing part 510 and the end of the optical path control member may be less than or equal to 0.7 mm. Specifically, the distance d3 between the first sealing part 510 and the end of the optical path control member may be less than or equal to 0.6 mm. Specifically, the distance d3 between the first sealing part 510 and the end of the optical path control member may be less than or equal to 0.5 mm.

When the distance d3 between the first sealing part 510 and the end of the optical path control member exceeds 0.7 mm, the distance between the first sealing part 510 defined as the bezel region and the end of the optical path control member may increase, and thus the size of the optical path control member may increase.

Meanwhile, referring to FIG. 5, the third sealing part 530 and the fourth sealing part 540 may also be disposed to be spaced apart from the end of the optical path control member or the second substrate.

At least one of the distance d4 between the third sealing part 530 and the end of the optical path control member and the distance d5 between the fourth sealing part 540 and the end of the optical path control member may be different from the distance d3 between the first sealing part 510 and the end of the optical path control member. For example, the distance d4 between the third sealing part 530 and the end of the optical path control member and the distance d5 between the fourth sealing part 540 and the end of the optical path control member may be different from the distance d3 between the first sealing part 510 and the end of the optical path control member.

Specifically, the distance d3 between the first sealing part 510 and the end of the optical path control member may be greater than the distance d4 between the third sealing part 530 and the end of the optical path control member and the distance d5 between the fourth sealing part 540 and the end of the optical path control member.

Accordingly, in the optical path control member, a size of a bezel region of an upper portion may be greater than the sizes of the bezel regions of the left and right portions.

The optical path control member may be applied to a screen of a display device. Due to the structure of the display device, the display device requires a space for mounting upper and lower mechanical portions, a connection portion between the display and the main board, or a camera or sensor. Accordingly, the upper and lower regions of the display device require a bezel region of a predetermined space. Accordingly, the bezel region of the left and right portions should be reduced for a display device having a narrow bezel.

Accordingly, the bezel region of the upper region of the optical path control member is formed greater than the bezel region of the left and right regions, thereby being easily applied to a display device for narrow bezels.

In the optical path control member according to the embodiment, upper and lower bezel regions may be reduced.

Specifically, a width of a cutting region of a first sealing part, a second sealing part, a dam part, and a connection region disposed on and below the optical path control member may be formed to be small. Accordingly, sizes of a first sealing part, a second sealing part, a dam part, and a connection region disposed inside the cutting region may be reduced.

Accordingly, the sizes of the first sealing part, the second sealing part, the dam part, and the connection region disposed in the bezel region and distances therebetween may be reduced. Accordingly, the bezel region of the optical path control member may be reduced.

In addition, when forming a first sealing part, a second sealing part, a dam part, and a connection region using a resin material or a conductive material inside the cutting region, overflowing of the resin material may be inhibited. Accordingly, it is possible to inhibit stains from occurring on the optical path control member.

In addition, the optical path control member according to the embodiment may make upper and lower bezel regions greater than left and right bezel regions. Accordingly, the optical path control member may be easily mounted on a display device that requires an upper and lower bezel region greater than the left and right bezel regions. In addition, a bezel region of the display device may be narrowed.

Hereinafter, a display device and a display device to which an optical path control member according to an embodiment is applied will be described with reference to FIGS. 16 to 20.

Figure 16:
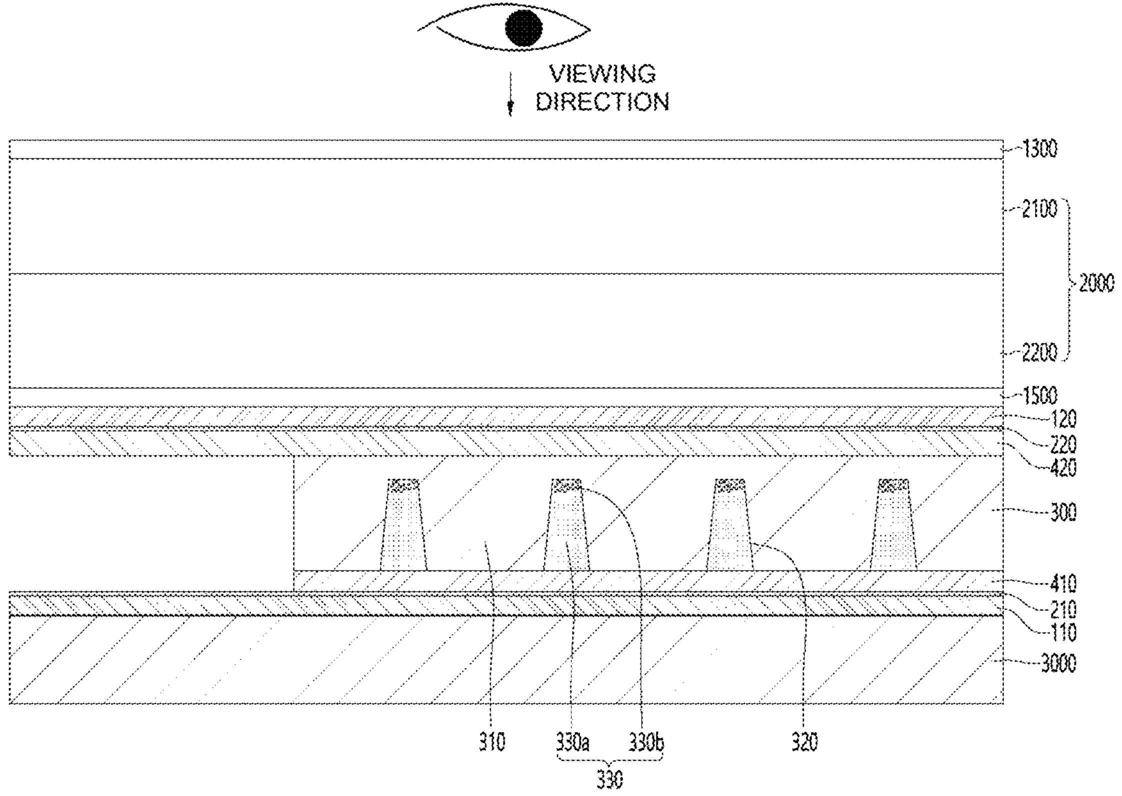
FIGS. 16 and 17 are cross-sectional views of a display device to which an optical path control member according to an embodiment is applied.
Figure 17:
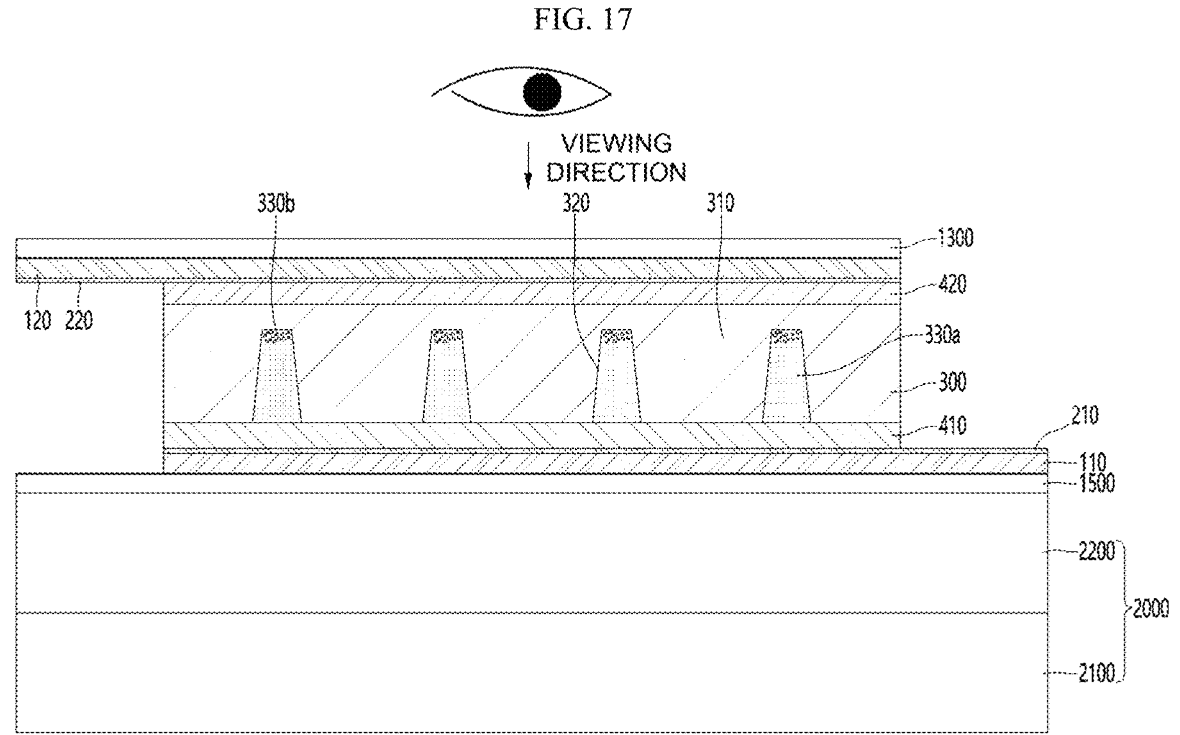

Referring to FIGS. 16 and 17, the optical path control member 1000 according to the embodiment may be disposed on or below the display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer including an optical transparent adhesive material.

The adhesive layer 1500 may include a release film. In detail, when adhering the optical path control member and the display panel, the optical path control member and the display panel may be adhered after the release film is removed.

The display panel 2000 may include a first base substrate 2100 and a second base substrate 2200. When the display panel 2000 is a liquid crystal display panel, the optical path control member may be formed under the liquid crystal panel. That is, when a surface viewed by the user in the liquid crystal panel is defined as an upper portion of the liquid crystal panel, the optical path control member may be disposed under the liquid crystal panel. The display panel 2000 may be formed in a structure in which the first base substrate 2100 including a thin film transistor (TFT) and a pixel electrode and the second base substrate 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first base substrate 2100 and the second base substrate 2200 is bonded to the first base substrate 2100 with the liquid crystal layer interposed therebetween. That is, a thin film transistor may be formed on the first base substrate 2100, a protective film may be formed on the thin film transistor, and a color filter layer may be formed on the protective film. In addition, a pixel electrode in contact with the thin film transistor may be formed on the first base substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 16, the optical path control member may be disposed under the liquid crystal panel and on the backlight unit 3000, and the optical path control member may be disposed between the backlight unit 3000 and the display panel 2000.

Alternatively, as shown in FIG. 17, when the display panel 2000 is an organic light emitting diode panel, the optical path control member may be formed on the organic light emitting diode panel. That is, when the surface viewed by the user in the organic light emitting diode panel is defined as an upper portion of the organic light emitting diode panel, the optical path control member may be disposed on the organic light emitting diode panel. The display panel 2000 may include a self-luminous element that does not require a separate light source. In the display panel 2000, a thin film transistor may be formed on the first base substrate 2100, and an organic light emitting element in contact with the thin film transistor may be formed. The organic light emitting element may include an anode, a cathode, and an organic light emitting layer formed between the anode and the cathode. In addition, the second base substrate 2200 configured to function as an encapsulation substrate for encapsulation may be further included on the organic light emitting element.

In addition, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting diode panel, the polarizing plate may be the external light reflection inhibiting polarizing plate.

In addition, an additional functional layer 1300 such as an anti-reflection layer, an anti-glare, or the like may be further disposed on the optical path control member 1000. Specifically, the functional layer 1300 may be adhered to one surface of the first substrate 110 of the optical path control member. Although not shown in drawings, the functional layer 1300 may be adhered to the first substrate 110 of the optical path control member via an adhesive layer. In addition, a release film for protecting the functional layer may be further disposed on the functional layer 1300.

Further, a touch panel may be further disposed between the display panel and the optical path control member.

It is shown in the drawings that the optical path control member is disposed at an upper portion of the display panel, but the embodiment is not limited thereto, and the optical path control member may be disposed at various positions such as a position in which light is adjustable, that is, a lower portion of the display panel, or between a second substrate and a first substrate of the display panel, or the like.

In addition, it is shown in the drawings that the light conversion unit of the optical path control member according to the embodiment is in a direction parallel or perpendicular to an outer surface of the second substrate, but the light conversion unit is formed to be inclined at a predetermined angle from the outer surface of the second substrate. Through this, a moire phenomenon occurring between the display panel and the optical path control member may be reduced.

Figure 18:
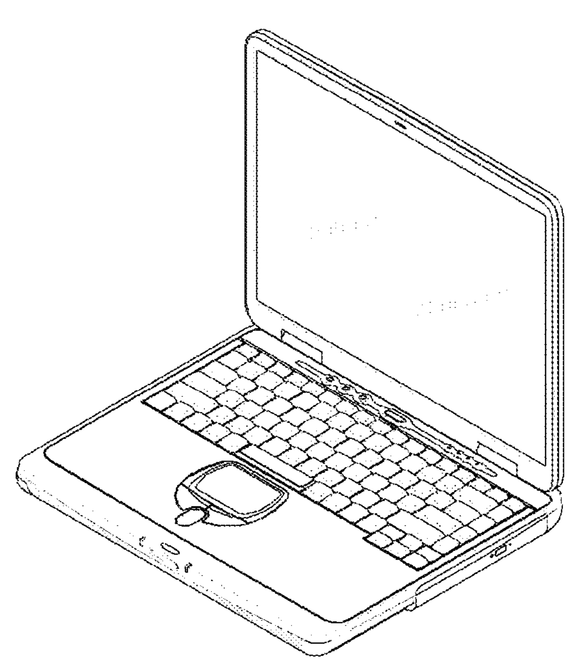
FIGS. 18 to 20 are views for describing one embodiment of the display device to which the optical path control member according to the embodiment is applied.
Figure 19:
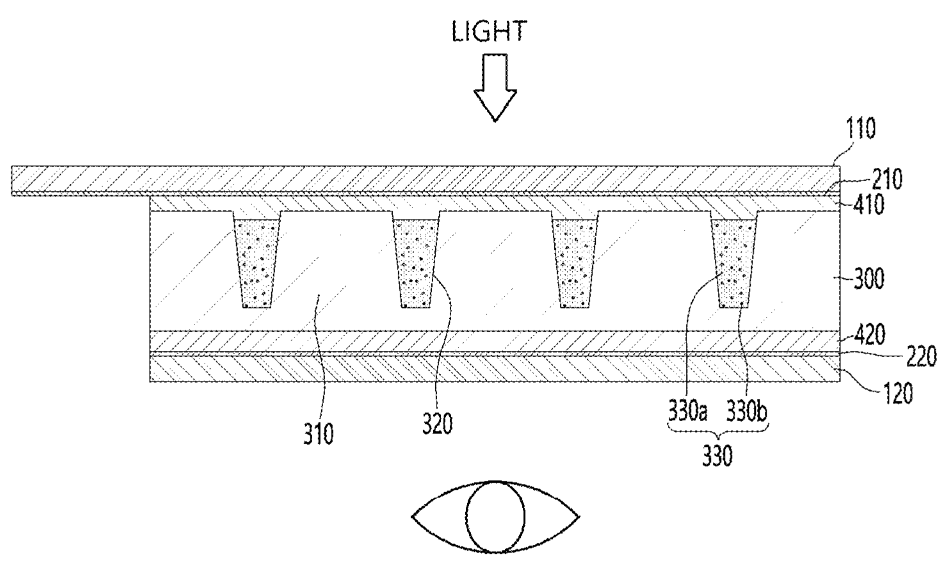
Figure 19:
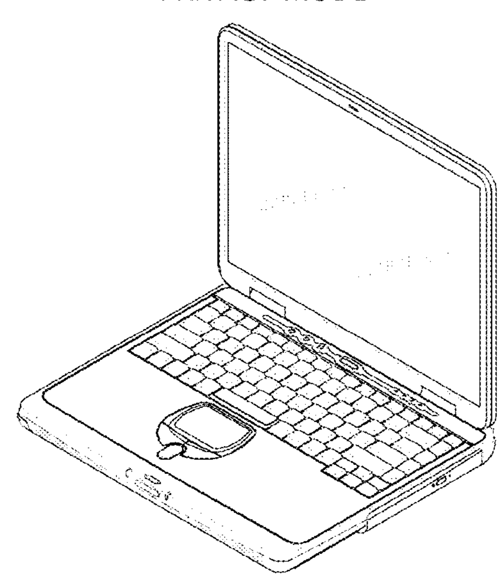
Figure 20:
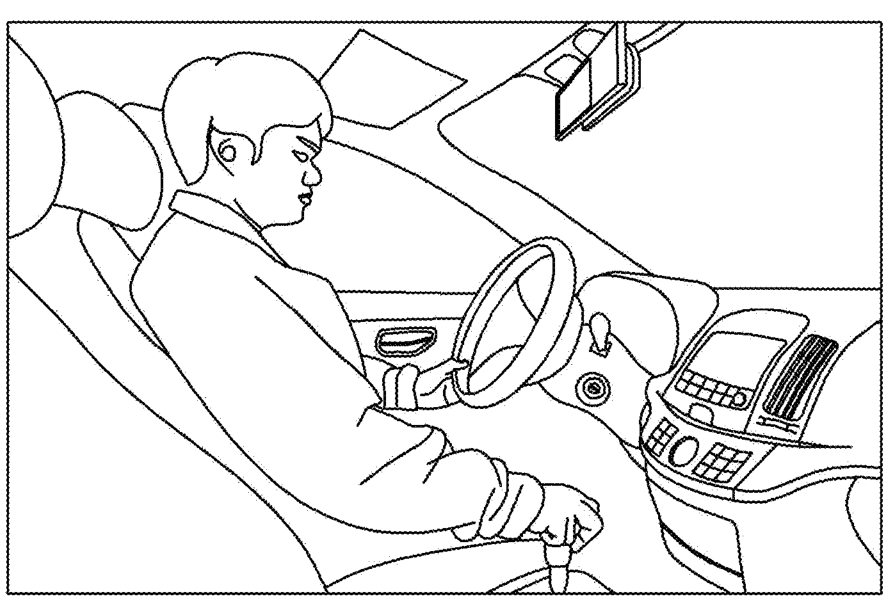

Referring to FIGS. 18 to 20, the optical path control member according to the embodiment may be applied to a display device that displays a display.

For example, when power is applied to the optical path control member as shown in FIG. 18, the accommodating part functions as the light transmitting part, so that the display device may be driven in the public mode, and when power is not applied to the optical path control member as shown in FIG. 19, the accommodating part functions as the light blocking part, so that the display device may be driven in the light blocking mode.

Accordingly, a user may easily drive the display device in a privacy mode or a normal mode according to application of power.

Light emitted from the backlight unit or the self-luminous element may move from the first substrate toward the second substrate. Alternatively, the light emitted from the backlight unit or the self-luminous element may also move from the second substrate toward the first substrate.

In addition, referring to FIG. 20, the display device to which the optical path control member according to the embodiment is applied may also be applied inside a vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle.

Further, the optical path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical path control member comprising:

a first substrate;

a first electrode disposed on the first substrate;

a second substrate disposed on the first substrate;

a second electrode disposed under the second substrate;

a light conversion unit including a plurality of accommodating parts disposed between the first electrode and the second electrode and in which a light conversion material is disposed;

a first sealing part and a second sealing part formed in a cutting region formed by cutting the second substrate, the second electrode, and the light conversion unit and disposed extending in a first direction; and a third sealing part and a fourth sealing part formed in a cutting region formed by cutting the second substrate, the second electrode, and the light conversion unit and disposed extending in a second direction different from the first direction, wherein the first sealing part and the second sealing part are disposed to face each other in the second direction, wherein the third sealing part and the fourth sealing part are disposed to face each other in the first direction, wherein a width of the first sealing part in the second direction is 0.2 mm or less, wherein thicknesses of the first and second sealing parts are greater than thicknesses of the third and fourth sealing parts, wherein the light conversion material is sealed inside of the accommodating parts by the first sealing part and the second sealing part, wherein the third sealing part and the fourth sealing part inhibit impurities penetrating toward a side surface of the optical path control member, wherein the optical path control member comprises a dam part disposed closer to an outer surface of the second substrate than to the second sealing part, and a connection region disposed closer to the outer surface of the second substrate than to the dam part, wherein a distance in the second direction between the second sealing part and the dam part is 0.5 mm or less, and wherein a distance in the second direction between the dam part and the connection region is 1.0 mm or less.

2. The optical path control member of claim 1, wherein a width of the second sealing part in the second direction is 0.5 mm or less.

3. The optical path control member of claim 1, wherein a width of the second sealing part in the second direction is 0.1 mm to 0.2 mm.

4. The optical path control member of claim 1, wherein a distance in the second direction between the second sealing part and the dam part is 0.1 mm to 0.2 mm.

5. The optical path control member of claim 1, wherein a distance in the second direction between the dam part and the connection region is 0.1 mm to 0.2 mm.

6. The optical path control member of claim 1, wherein the first sealing part is disposed to be spaced apart from an end of the second substrate, and wherein a distance in the second direction between the first sealing part and the end of the second substrate is 0.7 mm or less.

7. The optical path control member of claim 6, wherein the third sealing part and the fourth sealing part are disposed to be spaced apart from the end of the second substrate, and wherein a distance in the second direction between the first sealing part and the end of the second substrate is different from at least one of a distance in the first direction between the third sealing part and the end of the second substrate and a distance in the first direction between the fourth sealing part and the end of the second substrate.

8. The optical path control member of claim 7, wherein the distance between the first sealing part and the end of the second substrate is greater than the distance between the third sealing part and the end of the second substrate and the distance between the fourth sealing part and the end of the second substrate.

9. The optical path control member of claim 1, wherein a length of the first sealing part in the first direction is different from a length of the second sealing part in the first direction.

10. The optical path control member of claim 9, wherein the length of the first sealing part in the first direction is greater than the length of the second sealing part in the first direction.

11. The optical path control member of claim 1, wherein the first sealing part is in contact with the third sealing part and the fourth sealing part.

12. The optical path control member of claim 11, wherein the second sealing part contacts the third sealing part and does not contact the fourth sealing part.

13. The optical path control member of claim 1, wherein a length of the third sealing part in the second direction is different from a length of the fourth sealing part in the second direction.

14. The optical path control member of claim 13, wherein the length of the fourth sealing part in the second direction is greater than the length of the third sealing part in the second direction.

15. The optical path control member of claim 14, wherein the fourth sealing part is closer to the connection region than to the third sealing part.

* * * * *